Jan. 14, 1936.   R. W. BOCKIUS   2,027,368
NAVIGATIONAL INSTRUMENT
Filed April 22, 1935   4 Sheets-Sheet 1
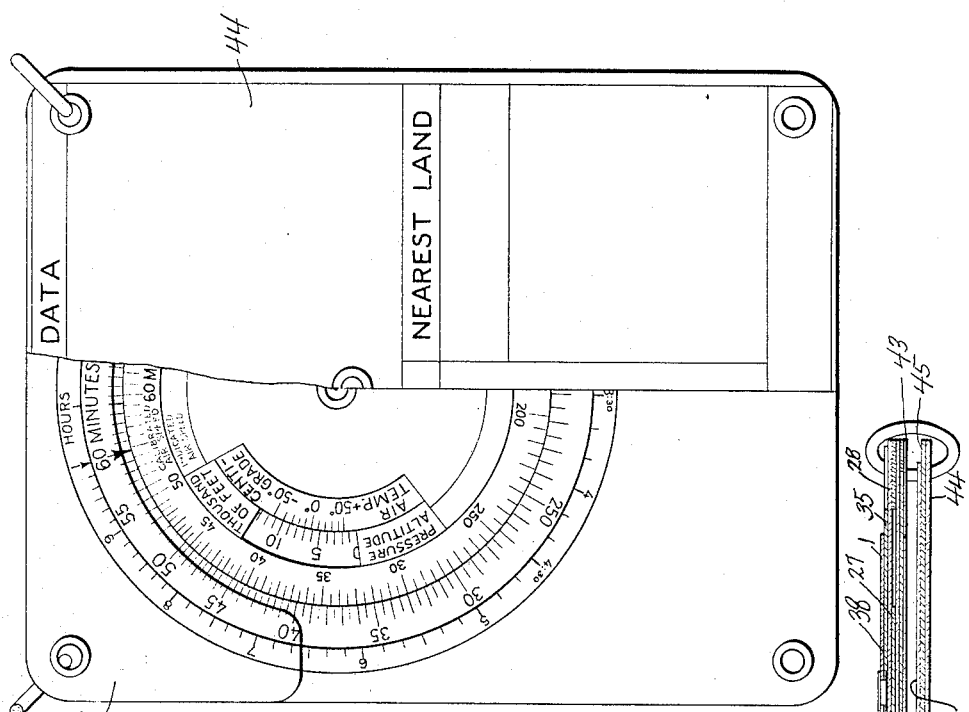
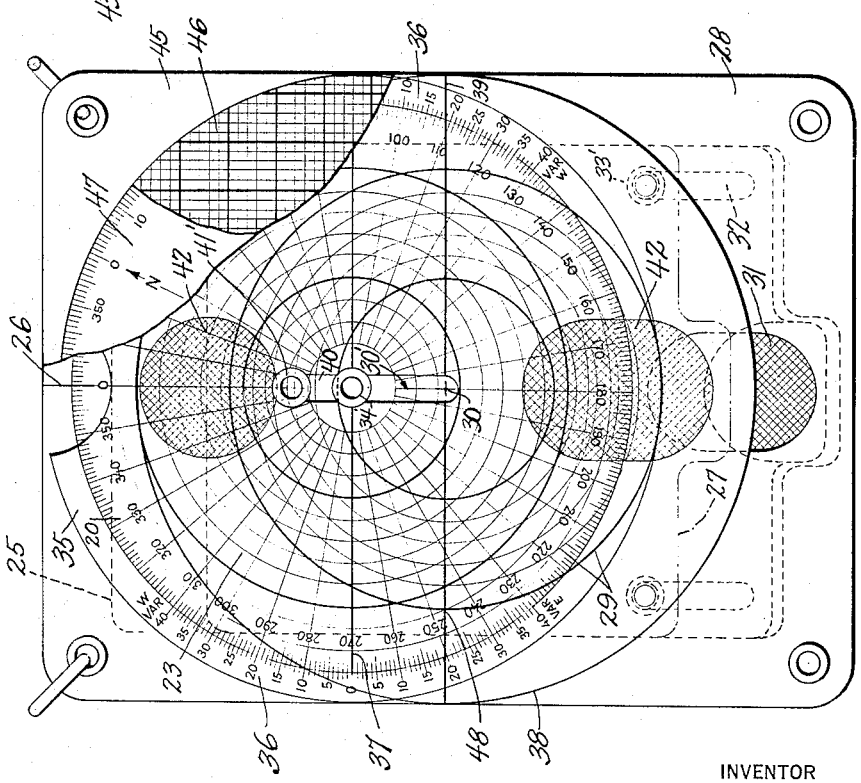
INVENTOR
R.W. BOCKIUS
BY
John J. Fitzgerald
ATTORNEY Jan. 14, 1936.   R. W. BOCKIUS   2,027,368
NAVIGATIONAL INSTRUMENT
Filed April 22, 1935   4 Sheets-Sheet 2

INVENTOR
R. W. BOCKIUS
BY
John J. Fitzgerald
ATTORNEY

Jan. 14, 1936.  R. W. BOCKIUS  2,027,368
NAVIGATIONAL INSTRUMENT
Filed April 22, 1935  4 Sheets-Sheet 3

INVENTOR
R. W. BOCKIUS
BY
John J. Fitzgerald
ATTORNEY

Jan. 14, 1936.  R. W. BOCKIUS  2,027,368
NAVIGATIONAL INSTRUMENT
Filed April 22, 1935  4 Sheets-Sheet 4

INVENTOR
R. W. BOCKIUS
BY
John J. Fitzgerald
ATTORNEY

Patented Jan. 14, 1936

2,027,368

UNITED STATES PATENT OFFICE 2,027,368

NAVIGATIONAL INSTRUMENT

Robert W. Bockius, United States Navy

Application April 22, 1935, Serial No. 17,629

6 Claims. (Cl. 33—76)

(Granted under the act of March 3, 1883, as amended April 30, 1928; 370 O. G. 757)

This invention relates to a device for determining the course actually followed or the course to be steered by an aircraft, taking into account the direction and velocity of any wind acting thereon and to solve other problems connected with navigation, both aerial and surface.

It is the object of this invention to provide an instrument of the type specified upon which the data of a problem may be readily set up and the solution quickly and accurately obtained. It is also among the objects of this invention to provide an instrument that is cheap to manufacture, light in weight, and that may readily be stowed in the pockets of flying clothes and be manipulated by one hand.

In the drawings:

Fig. 1 is a plan view of my invention with parts broken away;

Fig. 2 is a plan view of the reverse side of the instrument with a portion of an auxiliary device preferably associated therewith removed to show the said reverse side of the instrument proper;

Fig. 3 is a section substantially on the median longitudinal line of the instrument;

I am aware that numerous devices for determining and solving the numerous navigational problems encountered in flight have heretofore been proposed and used, but all those with which I am acquainted are cumbersome in size and inconvenient to use in the restricted space of the cockpit of an airplane and many of them require both hands to manipulate them. The present invention provides an instrument that is sufficiently accurate in all respects and yet may be carried in the flying clothes of the aviator.

Figure 4:
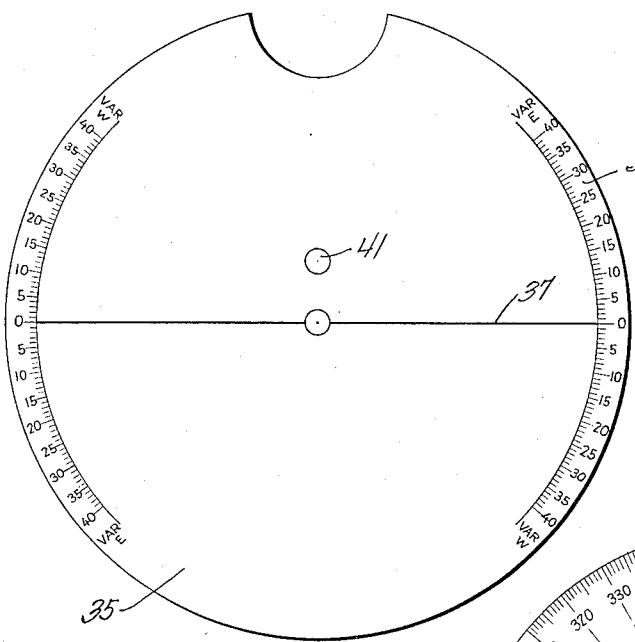
Fig. 4 is a plan view of one of the discs of the instrument calibrated to read directions corrected for compass variations.
Figure 5:
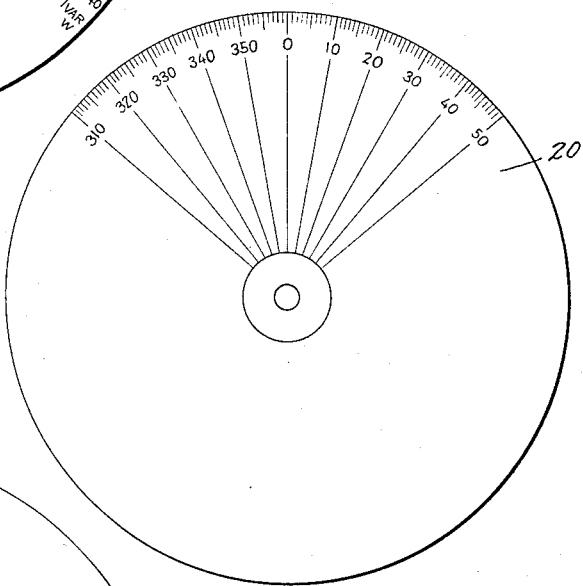
Fig. 5 is the compass rose disc.
Figure 6:
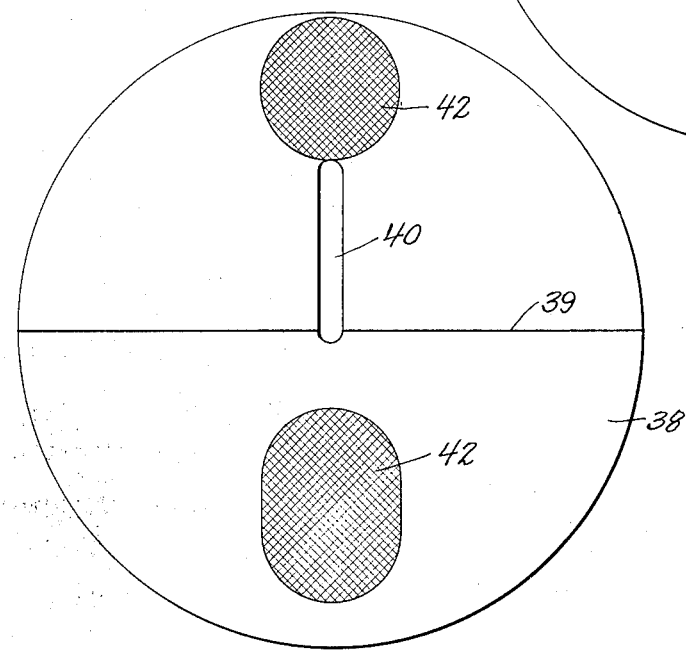
Fig. 6 is a disc bearing a line that serves as one side of the vector triangle.
Figure 7:
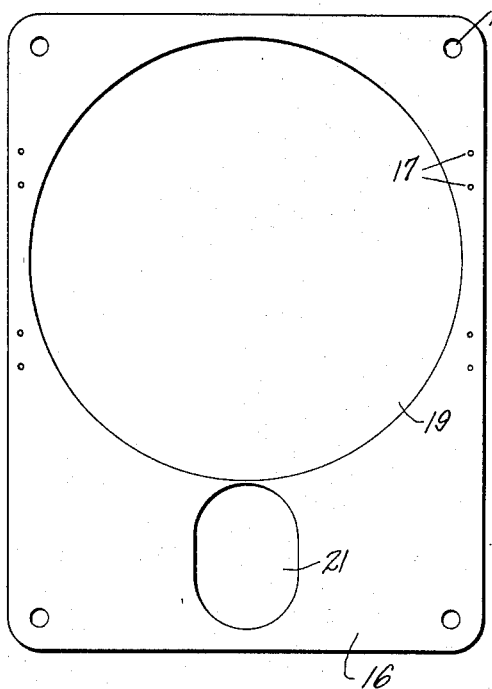
Figure 7 is an opaque plate that serves as the base.
Figure 8:
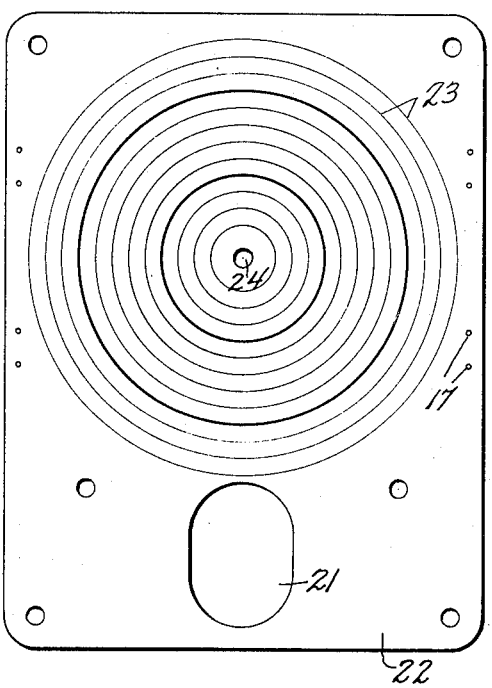
Fig. 8 is a plate bearing ground-speed circles.
Figure 9:
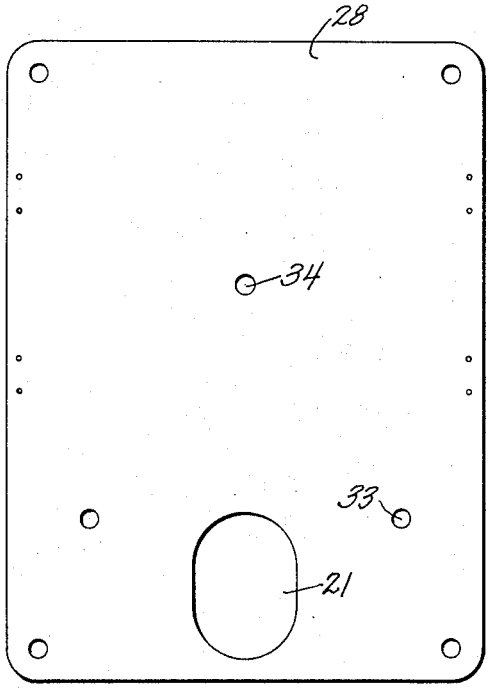
Fig. 9 is a transparent plate that holds a slidable member, hereinafter mentioned, in position.
Figure 10:
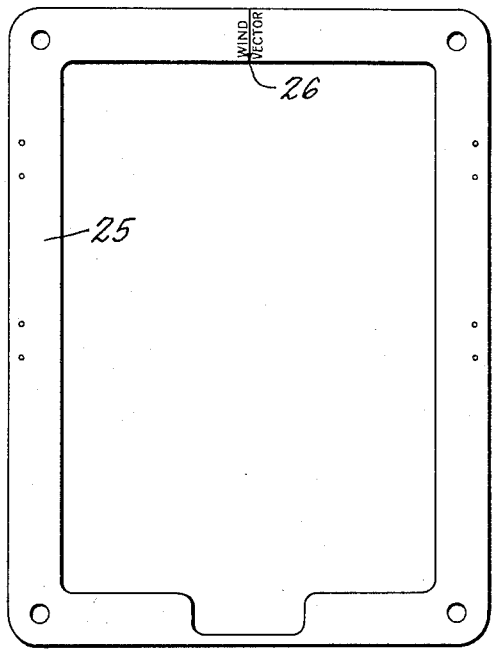
Fig. 10 is a spacer and a guide member within which the aforesaid slidable member moves.
Figure 15:
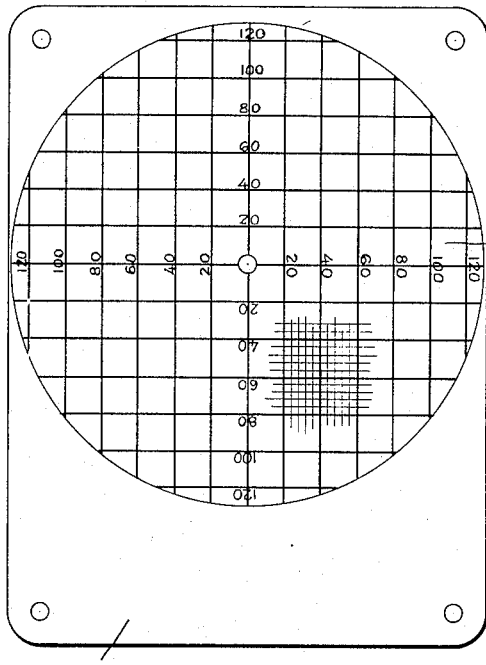
Figure 12:
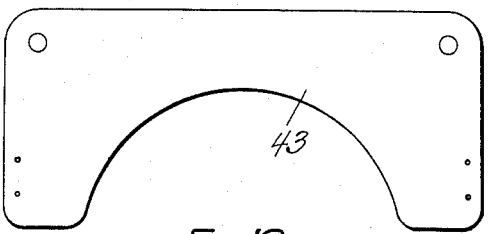
Fig. 12 is a member used to hold the compass rose, by friction, in a position to which the rose is set.
Figure 13:
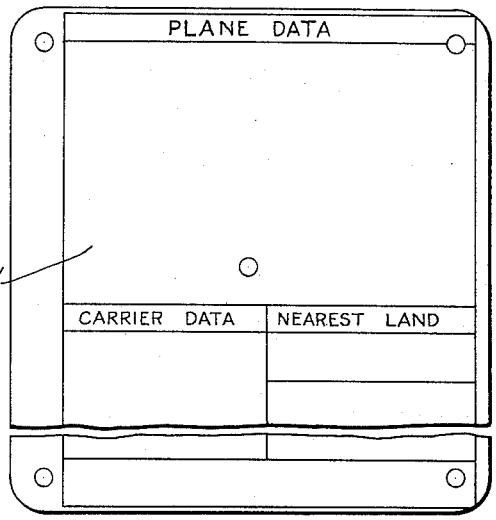
Fig. 13 shows a convenient sheet for recording certain data.
Figure 11:
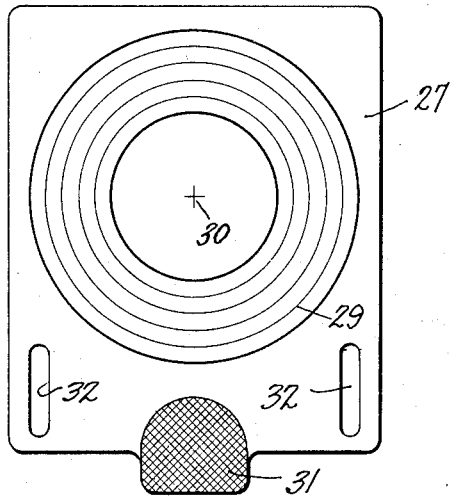
Fig. 11 is the slidable member, above mentioned, bearing wind velocity circles.
Figure 14:
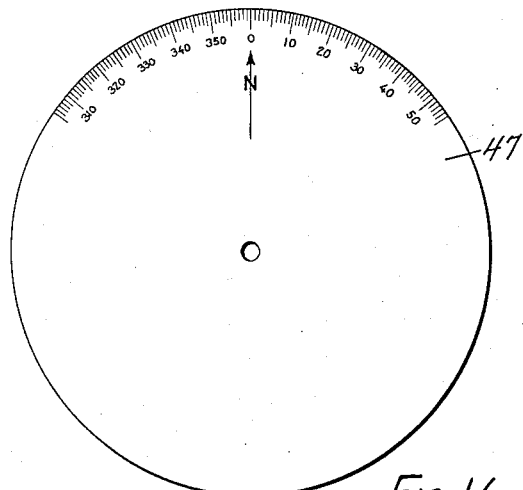
Fig. 14 is a compass rose mounted on the grid shown in Fig. 15 and associated with the member in Fig. 13 to constitute an auxiliary device.

My device comprises an opaque base member 16, preferably of the material commonly called xylonite, having in it perforations 17 for the insertion of a light fastening means and holes 18 in the corners thereof to receive hollow rivets. A circular cut-out portion 19 provides space for mounting the compass rose 20 with both faces of the rose flush with the corresponding faces of the plate 16. The elongated cut-out portion 21 permits access to manipulate the slidable member hereinafter described. Inasmuch as several of the members of the device have perforations that register with the perforations 17, have holes in the corners, and elongated cut-out portions adapted to register with 21, these features will not be described but merely indicated by the same reference characters as in Fig. 7.

Secured to the member 16 is a transparent plate 22, which may be termed the ground-speed plate, having on it concentric circles 23 to indicate ground speeds. At the center of the circles 23 is a hole 24 through which is passed a fastening means for rotatably securing the compass rose 20 thereto in position in the opening 19 of member 16.

A spacer and guide frame 25 is secured against the plate 22 and provided with an index marker 26 on one end thereof along the median longitudinal line of the frame. A transparent air-speed plate 27 is slidable in the frame 25 which serves as a guide to insure accurate linear movement of the member 27 and also as a spacer to give the plate 27 freedom of movement under the transparent cover plate 28 that is disposed against the frame 25. The member 27 has inscribed on it air-speed circles 29 and a cross or other indicating mark 30 at the center of these circles. A roughened tab 31 is accessible through the openings 21 to be grasped between finger and thumb to shift the plate 27 longitudinally. Elongated slots 32 receive rivets 33' fixed in the holes 33 in plates 22 and 28 to act as additional guide means for the member 27.

Rotatably mounted upon a rivet in the hole 34 in member 28 is a reader-disc 35, the position of the hole 34 being such that disc 35 is concentric with the circles 23 on the member 22. Angular calibrations 36 are inscribed on the margin of disc 35 extending in opposite directions from a zero line 37 to cooperate with compass rose 20 and give directly readings corrected for compass variation. A heading-disc 38 is disposed over disc 35 and has on it a diametral line 39 and formed in it, along a radius at right angles to line 39, an elongated slot 40 through which passes a rivet 41' fixed in hole 41 in disc 35, and also the rivet 34' which secures the disc 35 to the plate. Disc 38 is thus constrained to rotate with the disc 35 but is slidable with respect thereto along the radius defined by slot 40. Roughened areas 42 are provided on disc 38 to insure adequate frictional contact of the operator's thumb with the disc and thereby facilitate the sliding of disc 38.

Compass rose 20 is held against displacement from the back of base member 16 by a yoke-shaped piece 43 of transparent material that overlies a portion of the edge of the compass rose. For convenience the compass rose may bear on its rear face scales for computing certain quantities relating to flight, as indicated in Fig. 2, but this constitutes no part of the present invention. The convenience and field of use of my device are enhanced by associating therewith a plate 44 having on one face spaces for recording any data desired. Against the other face of the plate 44 is secured a plate 45 having on it a grid 46 and rotatably mounted over the grid a compass rose 47.

While numerous uses for the present invention will suggest themselves to those skilled in this art its operation in the solution of a specific problem will be set forth. If the direction and velocity of the wind are known and a given course is to be made good in an aircraft at a known air speed, the course to be steered and the ground speed can be readily determined.

The manipulation for solving the above stated problem is as follows:

Compass rose 20 is rotated to set the direction from which the wind is coming opposite the index line 26 and the plate 27 is slid to bring the marker or indicium 30 into the position on circles 23 corresponding to the wind velocity at the chosen scale; for example, if for this problem the spacing of circles 23 be taken as 10 knots and the wind velocity is 25 knots per hour the mark 30 would be moved to the position 30' on Fig. 1, the innermost circle 23 being the 20 knot circle to prevent overcrowding at the center. Disc 38 is then rotated about the rivet 34' and slid on disc 35 until the diametral line 39 passes through the point 30' and also through the point on compass rose 20 representing the course to be made good. If the compass variation is zero the course to be steered is then read on compass rose 20 opposite line 37 or, as is usually the case, correction is made for the compass variation by reading on disc 20 the course to be steered opposite the calibration 36 representing the magnitude of the variation. The ground speed is represented by the position, with respect to circles 23, of the intersection of line 39 and the circle 29 which represents the air speed of the craft. If the circles 23 and 29 are considered to represent 10 knot intervals the set-up shown in Fig. 1 would be interpreted as follows, assuming a compass variation of 15° west:

The position of point 30 indicates a wind velocity of 45 knots and a wind coming from 0° true. The course to be made good is shown to be 250° and if the air speed be 100 knots then the ground speed is indicated at 48 as being 110 knots and the compass course to be steered is shown opposite the calibration 15° west on scale 36 as being 285°.

The application of this invention to the solution of other problems involving vector triangles will be apparent to those skilled in the navigating art.

The invention described herein may be manufactured and used by or for the Government of the United States for governmental purposes without the payment of royalties thereon.

I claim:

1. A navigational instrument, comprising a base plate, having a circular aperture therein, a compass rose disposed in said aperture, a transparent ground-speed plate disposed on said base plate and having on it equally spaced circles concentric with said compass rose, means rotatably securing said rose to said ground-speed plate, a spacer frame disposed on said ground-speed plate, an air speed plate of less length than the aforesaid plates slidable in said frame on said ground-speed plate having a roughened tab extending from one end thereof and having on it air-speed circles and a wind velocity indicium at the center of said air-speed circles; a transparent plate disposed over said spacer and said air-speed plate; said base, said ground-speed plate, said frame and said transparent plate being all secured together at their margins, and said base, said ground-speed plate and said transparent plate being apertured to give access to said tab to slide said air-speed plate; a reader-disc rotatably secured to said transparent plate concentrically with said rose having on its margin compass variation indicia and a reader-line, and a heading-disc mounted on said reader-disc to rotate therewith and to be radially slidable thereon, said heading-disc having a diametral line movable by sliding said heading-disc and turning said reader-disc to pass through said wind velocity indicium and through any selected point on said compass rose.

2. A navigational instrument, comprising a base plate, having a circular aperture therein, a compass rose disposed in said aperture, a transparent ground-speed plate disposed on said base plate and having on it circles representing ground-speeds concentric with said compass rose and to which said rose is rotatably attached, a spacer frame disposed on said ground-speed plate, an air-speed plate of less length than the aforesaid members disposed to slide on said ground-speed plate within said frame as a guide, said air-speed plate having thereon concentric air-speed circles and a wind velocity indicium at the center of said air-speed circles and a tab extending from one end, a transparent plate over said spacer and said air-speed plate; said base, said ground-speed plate, said spacer and said transparent plate being all secured together at their margins and said base, said ground-speed plate and said transparent plate being all apertured to give access to said tab; a reader-disc rotatably secured to said transparent plate concentrically with said rose having on its margin compass variation indicia readable in conjunction with said rose, and a heading-disc mounted on said reader-disc to rotate therewith and movable with respect thereto to set a diametral line on said heading-disc to pass through said wind velocity indicium and through any chosen point on said compass rose.

3. A navigational instrument, comprising a transparent ground-speed member having a plurality of concentric circles thereon, a compass rose rotatably secured to the under side of said member concentrically with said circles, an air-speed plate accurately mounted to be slidable on said member parallel to one edge only of said plate and having on it concentric circles and a wind velocity indicium at the center of said concentric circles thereon and a tab extending from one end thereof, a transparent plate over said airspeed plate, there being apertures provided in said member, said air-speed plate and said transparent plate to give access to said tab, a first disc rotatably mounted on said transparent plate concentrically with said rose and a second disc mounted on said first disc to be rotatable therewith and to be slidable radially thereof, said second disc having on it a diametral line that may be brought into coincidence with said wind velocity indicium and with any chosen point on said rose, and the first disc having on its margin indicia readable in conjunction with said rose corresponding to compass variations of different magnitudes.

4. A navigational instrument, comprising rotatable means to indicate compass directions, fixed means bearing concentric ground speed circles associated therewith, means bearing concentric air-speed circles and a wind velocity indicium at the center thereof movable parallel to a fixed line and settable to position said indicium at the center of said ground-speed circles, a first disc rotatably mounted concentrically with said rotatable means, and a second disc mounted on the first disc to rotate therewith and to be settable parallel to one radius of the first disc, said second disc having on it a line that may be made to coincide simultaneously with said indicium and a chosen compass direction on said rotatable means, and said first disc having indicia readable in conjunction with said rotatable means to indicate a direction that is a function of the setting of the rotatable means of the position of the indicium of said chosen compass direction and of the compass variation.

5. A navigational instrument, comprising direction indicating means settable to indicate a wind direction, a member bearing circles indicating ground speeds operatively associated therewith, a member bearing air-speed circles and a wind velocity indicium at the center of said circles operatively associated with the aforesaid parts to be slidable with respect thereto for indicating a wind velocity on said ground-speed circles, a first disc rotatably mounted concentrically with said ground-speed circles and a second disc slidably mounted on said first disc, there being on said second disc a line movable to cooperate with said indicium and a chosen direction on said direction indicating means to form one side of a vector triangle, said first disc bearing compass variation indicia readable in conjunction with said direction indicating means to show the heading to be steered to make good the course indicated by said chosen direction, the ground-speed being indicated on said ground-speed circles at the intersection of said line and the circle corresponding to the air-speed.

6. A navigational instrument, comprising a direction indicating member settable to indicate a wind direction, a member bearing ground-speed circles operatively associated therewith, a member bearing air-speed circles and at their center a wind velocity indicium settable to indicate a wind velocity on said ground-speed circles, a member settable to define a line that includes said indicium and a chosen point on said first mentioned member, the intersection of said line with a chosen air-speed circle indicating a ground speed that is a function of said chosen air-speed, of the wind vector, and of the direction of said line, and means to read on said first member a direction that is determined by the directional position of said line, of said wind vector and of the compass variation.

ROBERT W. BOCKIUS.